United States Patent [19]

Fink

[11] Patent Number: 4,482,121
[45] Date of Patent: Nov. 13, 1984

[54] WALLBOARD FASTENER

[76] Inventor: Carl J. Fink, 9675 SW. 1st Pl., Boca Raton, Fla. 33433

[21] Appl. No.: 95,190

[22] Filed: Nov. 16, 1979

[51] Int. Cl.³ .............................................. F16M 13/00
[52] U.S. Cl. ................................. 248/489; 248/225.2; 248/223.4; 248/224.2; 52/364
[58] Field of Search ...................... 248/205 B, 214, 215, 248/223.4, 224.2, 225.2, 466, 489; 52/364, 520; 312/242, 245

[56] References Cited

U.S. PATENT DOCUMENTS

| | | | |
|---|---|---|---|
| 1,848,937 | 3/1932 | Coventry | 248/224.2 |
| 2,681,249 | 6/1954 | Zabilka | 248/224.2 X |
| 2,823,004 | 2/1958 | Melloh | 248/215 |
| 3,268,195 | 8/1966 | Hoffman | 248/489 |
| 3,330,518 | 7/1967 | Adler | 248/224.2 |
| 3,547,389 | 12/1970 | Mitchell | 248/489 X |
| 3,881,676 | 5/1975 | Reinwall | 248/224.- |
| 4,222,544 | 9/1980 | Crowder | 248/224.2 X |

FOREIGN PATENT DOCUMENTS 2404411 4/1979 France .............................. 248/225.2

Primary Examiner—William H. Schultz

[57] ABSTRACT

A wall fastener for releasable attachment to a wallboard having an angled slot formed therethrough includes a one-piece, elongated, flat, resilient base plate having a substantially rectilinear first element which has opposite ends and at least one bore hole formed therethrough between the opposite ends thereof, a substantially rectilinear second element disposed at an acute angle to the first element, which has opposite ends, one end of which is integrally joined to one of the ends of the first element, and a substantially rectilinear third element. The third element has opposite ends, one end of which is integrally joined to the other end of the second element, and the third element is disposed at an angle to the second element which is substantially complementary to the acute angle so that the third element is substantially parallel to the first element. At least one of the second and third elements has at least one bore hole extending therethrough aligned with the at least one bore hole of the first element. The second and third elements are insertable in the wallboard slot so that the first element lies substantially flush against the first surface of the wallboard, the second element lies substantially within the slot and the third element lies substantially flush against the rear surface of the wallboard. A screw may be threadably received through the bore holes so as to securely fasten the base plate to the wallboard.

9 Claims, 8 Drawing Figures

WALLBOARD FASTENER

The present invention relates to a hollow wall or wallboard fastener which is designed to be inserted through the wall surface so that it can be used as a support to hang or attach certain articles.

Wallboards such as those made from gypsum plasterboard or plaster walls do not have any appreciable anchoring strength for receiving surface fasteners for supporting articles (e.g., mirrors, paintings, bathroom and kitchen fixtures, etc.) on the wallboard surface. Various types of wallboard fasteners have been proposed to alleviate this problem (see e.g., U.S. Pat. Nos. 1,802,934; 2,282,631 2,642,038; 3,112,911; 3,282,547; 3,305,984; 3,536,287; and 3,926,394). Certain types of conventional fasteners such as plaster screws and expansion screws, while generally satisfactory, are still found to pull free from the wallboard when any slight stresses are applied since the wallboard material provides very little anchoring support for these types of screw fasteners. In addition, these types of fasteners require considerable clearance rearwardly of the wallboard, which is not always available.

More particularly, in buildings constructed with concrete blocks or having a concrete wall, the interior dry wall or wallboard is typically secured to the concrete wall by means of ½" or ¾" furring strips. This type of construction therefore leaves only about a ½" clearance in back of the dry wall, which is not enough room to install fasteners of the type which require either a spring, a lock mechanism or movable arms to securely anchor it in place.

Other types of fasteners which adhesively secure themselves to the surface of the wallboard have also been found to be unsuitable. Typically, when such fasteners are loaded, they tend to pull the paper surface coating off the wallboard.

It is therefore an object of the present invention to provide an improved wallboard fastener which may be hanging strength than conventional fasteners, which is removably secured to a wallboard to hang or secure an article thereon.

It is another object of the present invention to provide such a wall-mounting device which is simple in design, easy to construct, and inexpensive in cost.

It is a further object of the invention to provide a novel wallboard fastener which has no moving parts, requires very little clearance, and which may be removed with minimal damage to the wallboard.

It is a more particular object of the present invention to provide a novel wallboard fastener having the foregoing attributes and characteristics which affords greater hanging strength than conventional fasteners, which is reusable and reliable in operation.

Certain of the foregoing and related objects are readily attained in a wall fastener for releasable attachment to a wallboard having an angled slot formed therethrough which includes a one-piece, elongated, flat, resilient base plate which is preferably made from sheet metal. The base plate has a substantially rectilinear first element which has opposite ends and at least one hole formed therethrough between the opposite ends thereof. The base plate also includes a substantially rectilinear second element which has a pair of opposite ends, one end of which is integrally joined to one of the ends of the first element so that the second element is disposed at an acute angle to the first element. The base plate further includes a substantially rectilinear third element which has a pair of opposite ends, one end of which is integrally joined to the other end of the second element. The third element is disposed at an angle to the second element which is substantially complementary to the acute angle so that the third element is substantially parallel to the first element. At least one of the second and third elements has at least one hole extending therethrough aligned with the first element. The second and third elements are insertable in the wallboard slot so that the first element lies substantially flush against the outer or front surface of the wallboard. A screw may be threadably received through the holes so as to securely fasten the base plate to the wallboard.

Most advantageously, the first element and the second element are disposed at an acute angle of about 23 degrees. Most desirably, the first element has three holes formed therethrough, each of the second and third elements has a hole formed therethrough aligned with one of the holes of the first element and another hole is formed at the intersection between the ends of the second and third elements which is aligned with the remaining hole of the first element.

In one preferred embodiment of the invention, the first element has a pair of longitudinally-extending slots formed therein on opposite sides of the hole formed therethrough and the hole, which is formed in at least one of the second and third elements, is formed at the intersection between the ends of the second and third elements. In another preferred embodiment, the first element has a pair of V-shaped, longitudinally-extending slots formed therein disposed on opposite sides of the hole formed therethrough, each of which is configured and dimensioned to slidably receive the flat head of a flat head bolt and which is provided with an abutment stop on which the head may rest.

Other objects and features of the present invention will become apparent from the following detailed description, considered in connection with the accompanying drawings, which disclose several embodiments of the invention. It is to be understood, however, that the drawings are designed for the purpose of illustration only, and not as a definition of the limits of the invention.

In the drawings, wherein similar characters denote similar elements throughout the several views.

Figure 1:
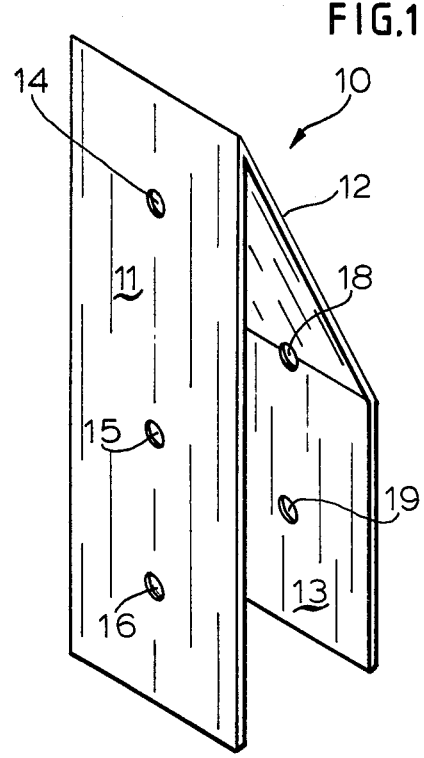
FIG. 1 is a perspective view of a novel wallboard fastener embodying the present invention.

Turning now in detail to the appended drawings, and, in particular, FIG. 1 thereof, therein illustrated is a novel wallboard fastener embodying the present invention which consists of a one-piece, elongated, flat, resilient, angled base plate 10, preferably made from sheet metal. The base plate is essentially composed of three elements —a first element 11, a second element 12, and a third element 13, each of which is rectilinear.

The first element has three vertically spaced-apart screw holes 14, 15, 16 formed therein, and it is joined to the second element 12 at an angle of 23° along its top edge. The second element is provided with a screw hole 17 (see FIG. 2) which is in alignment with screw hole 14, and it has a lower edge or end which merges with the third element 13. At the point of intersection of the ends of the second and third element, a further screw hole 18 is provided which is in alignment with screw hole 15 of first element 11. Third element 13 also has a centrally disposed screw hole 19 which, in a like manner, is in alignment with screw holes 16 of first element 11.

Figure 2:
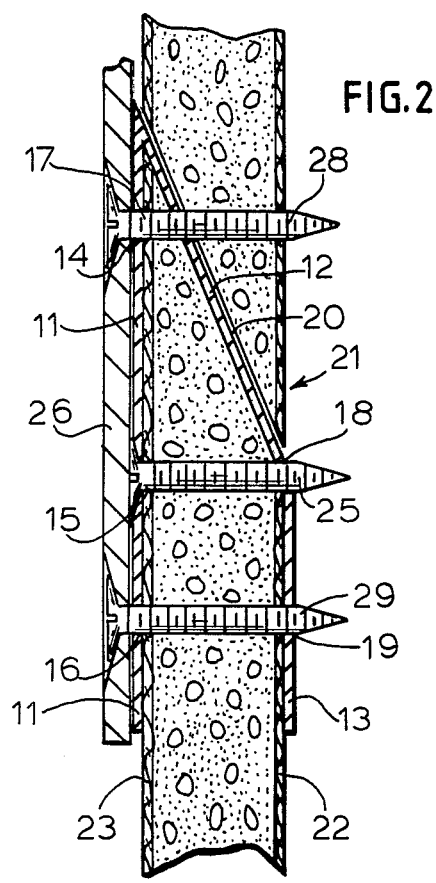
FIG. 2 is a sectional view of the wallboard fastener shown in FIG. 1 supported on a wallboard, further showing an article being supported thereby against the wallboard by means of screws.

As can be seen in FIG. 2, the wall fastener is intended to be inserted in a downwardly angled slot 20 formed in wallboard 21. In particular, the second and third elements 12 and 13 of base plate 10 are inserted through slot 20 so third element 13 lies flush against the rear surface 22 of wallboard 21, second element 12 lies substantially within the slot 20 of wallboard 21, and first element 11 lies substantially flush against the front wall 23 of wallboard 21. A self-tapping screw 25 is inserted through screw holes 15 and 18 in order to securely fasten base plate 10 to wallboard 21. A mounting plate 26 of a wall-hung fixture such as a towel rack, soap dish, etc. is provided with two screw holes in which a pair of self-tapping flat head screws 28, 29 are inserted. These screws 28 and 29 are, in turn, received in the aligned holes 14, 17, and 16, 19, respectively. This method of mounting provides a very secure and safe system for mounting very heavy articles, and it is believed that the fastener of the instant invention improves the strength characteristics of the wall by over 400%.

Figure 3:
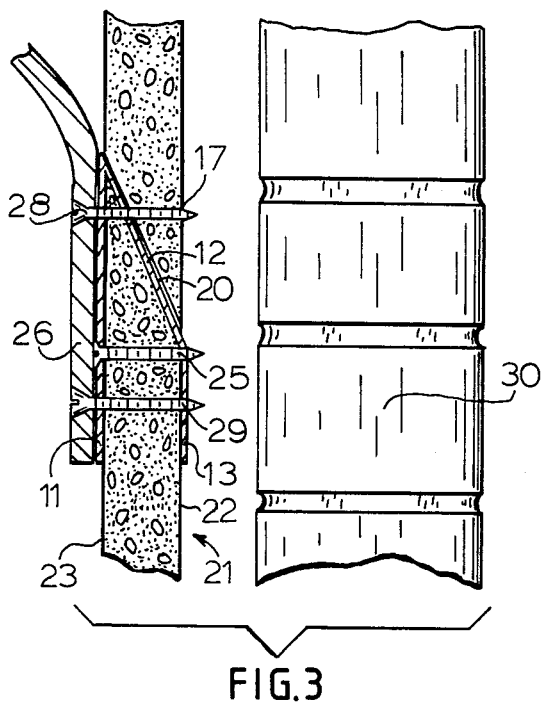
FIG. 3 is a sectional view, in part elevation, of the wallboard fastener shown in FIGS. 1 and 2, mounted on a dry wall, further showing its relationship to a concrete wall disposed opposite the interior surface of the wallboard.

As can be seen in FIG. 3, the wall fastener of the present invention requires very little clearance between the wallboard and the concrete wall 30. As a result, the wallboard fastener may be used in most any environment, and in particular, in any restricted area having minimal clearance behind the wallboard.

Figure 4:
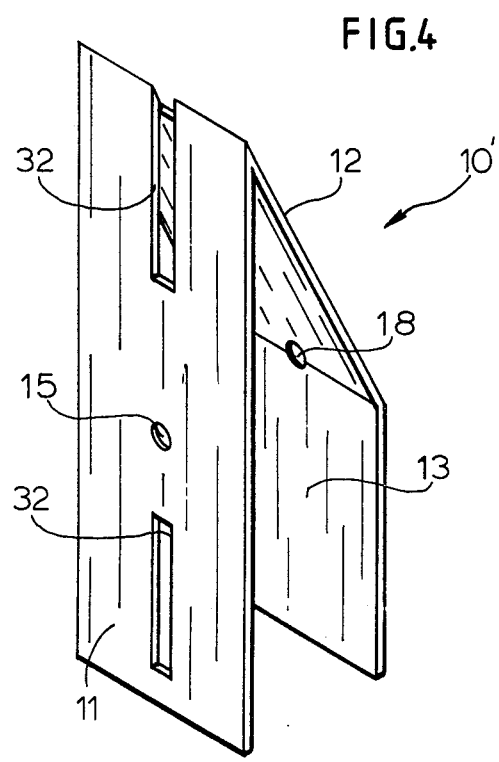
FIG. 4 is a perspective view of another novel wallboard fastener embodying the present invention.
Figure 5:
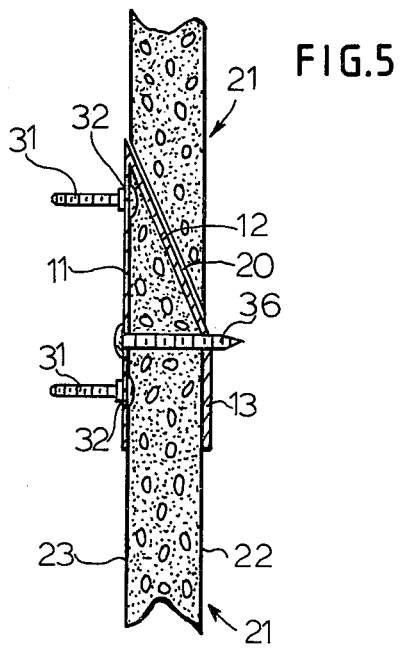
FIG. 5 is a sectional view of the wallboard fastener shown in FIG. 4 mounted on a wallboard.

A different embodiment of the invention is shown in FIG. 4. In this case, in place of screw holes 14, 17, and 16, 19, the first element 11 of the base plate 10' is provided with a pair of longitudinally-extending generally rectangular slots 32 disposed on opposite sides of hole 15. As shown in the mounted position of FIG. 5, a self-tapping screw 36 is threadably received through screw holes 15 and 18 and a pair of threaded bolts 31 is inserted within these slots 32 such that their shanks extend outwardly from the wallboard 21. A mounting plate such as the type shown in FIG. 3 may be mounted on these threaded bolt shafts by means of nuts, if desired (not shown).

Figure 6:
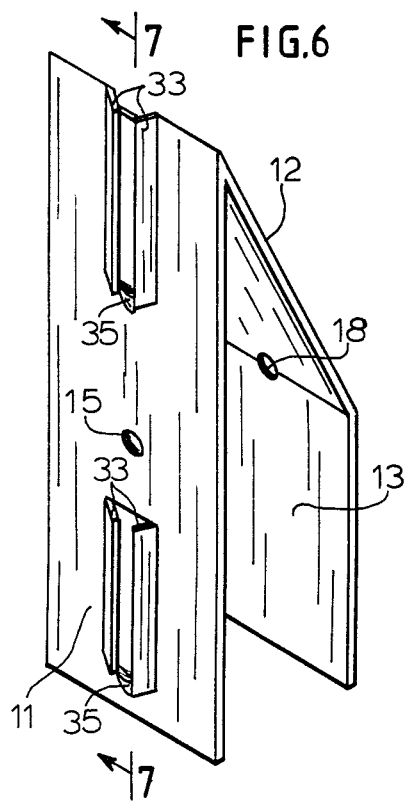
FIG. 6 is a perspective view of another novel wallboard fastener embodying the present invention.
Figure 7:
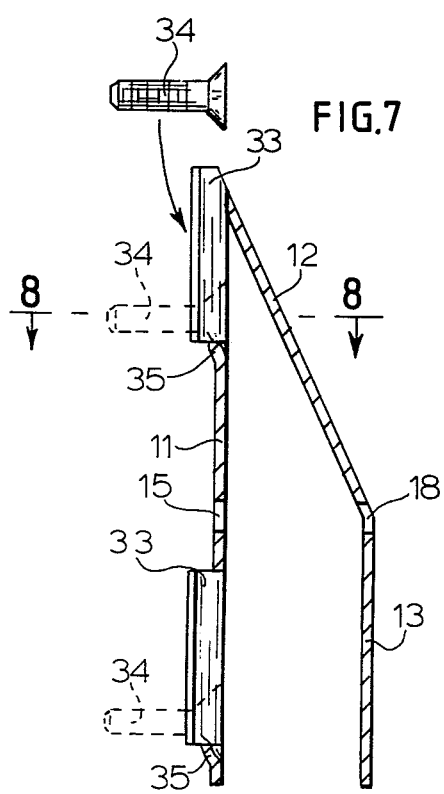
FIG. 7 is a sectional view taken along lines 7—7 of FIG. 6, further showing in full line the provision of a screw and, in phantom line, the final mounting position of a pair of screws.
Figure 8:
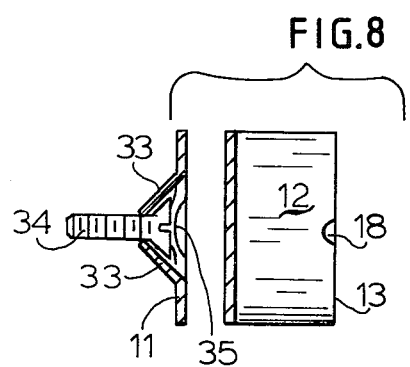
FIG. 8 is a sectional view taken along line 8—8 of FIG. 7.

A further embodiment of the invention is illustrated in FIGS. 6-8. In this case, in place of the rectangular slots 32 of the FIG. 4 and 5 embodiment, V-shaped slots are formed by V-shaped wings 33 in which tapered flat screw heads of screws 34 may be slidably mounted. The base of each of these V-shaped slots is provided with an abutment stop 35 on which the screw head rests, as shown in FIG. 7. The shanks of these screws 34 may, in turn, be embedded in a ceramic fixture for facile mounting of the same. If it is desired to remove the fixture, all that is required is that the fixture be slid upwardly so as to remove the screw heads from the V-shaped slots.

While only several embodiments of the invention have been shown and described, it will be obvious that many modifications and changes may be made thereunto, without departing from the spirit and scope of the invention.

What is claimed is:

1. A wall fastener for releasable attachment to a wallboard having an angled slot formed therethrough, comprising:

a one-piece, elongated, flat, resilient base plate having a substantially rectilinear first element which has opposite ends and at least one bore hole formed therethrough between said opposite ends thereof, a substantially rectilinear second element which has opposite ends, one end of which is integrally joined to one of said ends of said first element, said second element being disposed at an acute angle to said first element, and a substantially rectilinear third element which has opposite ends, one end of which is integrally joined to the other end of said second element, said third element being disposed at an angle to said second element which is substantially complementary to said acute angle so that said third element is substantially parallel to said first element and at least one of said second and third elements having at least one bore hole extending therethrough aligned with said at least one bore hole of said first element, said second and third elements being insertable in said wallboard slot so that said first element lies substantially flush against the front surface of the wallboard, said second element lies substantially within the slot and said third element lies substantially flush against the rear surface of the wallboard and so that a screw may be threadably received through said bore holes so as to fasten said base plate to said wallboard.

2. The wall fastener according to claim 1, additionally including at least one screw.

3. The wall fastener according to claim 1, wherein said first element and said second element are disposed at an acute angle of about 23 degrees.

4. The wall fastener according to claim 1, wherein said first element has three bore holes formed therethrough, wherein each of said second and third elements has a bore hole formed therethrough aligned with one of said bore holes of said first element and wherein another bore hole is formed at the intersection between the ends of said second and third elements which is aligned with the remaining bore hole of said first element.

5. The wall fastener according to claim 1, wherein said first element has a pair of longitudinally-extending slots formed therein on opposite sides of said hole formed therethrough and wherein said hole formed in at least one of said second and third elements is formed at the intersection between the ends of said second and third elements.

6. The wall fastener according to claim 1, wherein said first element has a pair of V-shaped, longitudinally-extending slots formed therein disposed on opposite sides of said hole formed therethrough, each of which is configured and dimensioned to slidably receive the tapered, flat head of a flat head bolt and which is provided with an abutment stop on which the bolt head may rest.

7. The wall fastener according to claim 1, wherein said fastener is made from a single piece of sheet metal.

8. The wall fastener according to claim 1, wherein said first element has at least one slot formed therein and wherein said fastener additionally includes a bolt mounted within said slot.

9. The wall fastener according to claim 1, wherein said first element has at least one V-shaped slot formed therein and wherein said fastener additionally includes a threaded bolt slidably received in said slot.

* * * * *